Fig.1.

Sept. 27, 1932.  F. W. DE VINNEY  1,879,129
WATER MEASURING TANK FOR CONCRETE PAVERS
Filed Feb. 15, 1929   5 Sheets-Sheet 4

Inventor:
Floyd W. Devinney,
by Parker Cook
Atty.

Patented Sept. 27, 1932

1,879,129

UNITED STATES PATENT OFFICE

FLOYD W. DE VINNEY, OF NUNDA, NEW YORK, ASSIGNOR TO THE FOOTE COMPANY, INC., OF NUNDA, NEW YORK, A CORPORATION OF DELAWARE

WATER MEASURING TANK FOR CONCRETE PAVERS

Application filed February 15, 1929. Serial No. 340,179.

This invention relates to new and useful improvements in water measuring tanks wherein a predetermined quantity of water can be delivered, the tank being especially adapted for concrete pavers so that a certain amount of water can be delivered to the batch in the mixer drum.

However, it will be understood at the outset that the tank and the cooperating parts might also be applied to other apparatus and machines wherein it is desirable, at intervals, to supply a certain or measured amount of water.

As is well known to those skilled in the concrete paving art, a supply of water has to be stored up so that it may be delivered to the aggregates in the mixing drum as the batch material is to be thoroughly mixed and watered before being delivered to the traveling bucket where the boom and bucket type of paver is used, or to the discharge chute when this is used.

An object of the present invention, therefore, is to provide a water tank for the paver wherein the same will be supplied from the supply line which is always connected to the nearest available water supply, and wherein after the tank is filled up and a small pressure begins to build up, the supply will be automatically cut off.

Still another object of the invention is to provide a water tank wherein the amount of water the tank will hold may be predetermined or easily regulated, as the amount of water supplied to the batches must be predetermined, as the final results of the distributed concrete is largely dependent upon the amount of water supplied to the batch while being mixed.

Still another object of the invention is to provide a water tank wherein the tank will be automatically filled and the supply line cut off before the water is discharged into the mixing drum. In fact, some States have ordinances and laws to this very effect, that any machines operating in their state must have the water tank inlet supply cut off previous to the discharge of the water into the mixer.

Still another object, therefore, of the present invention is to provide a tank that may be regulated to hold say from twenty to fifty gallons of water and wherein if it is desired to distribute say fifty gallons of water to each batch, the tank may be so adjusted, so that when the fifty gallons have been supplied, the supply will be automatically cut off and the contents of the tank may then be discharged into the drum.

Still another object of the invention is to provide a tank wherein the capacity may be regulated within certain limits to gallons and fractions thereof, so that exactly the desired amount of water may be fed into the mixer drum.

Still another object of the drum is to provide a tank wherein the capacity may be regulated to a desired number of gallons and fractional part of the gallon and the tank and its parts being so arranged that exactly the predetermined amount will be delivered each time to the drum as all the water in the tank below the accurately set piston head will be discharged when the discharge valve is operated.

Still another object of the invention is to so arrange the tank and its cooperating mechanism, that after the tank has been discharged, an operation of the lever mechanism will cut off the discharge from the now empty tank and in doing so will automatically open the supply line to the tank, which will automatically close after the tank has been filled and a slight pressure built up.

Still another object of the invention is to so construct a tank and its associated parts that the predetermined amount of water may be delivered to the mixing drum regardless of the position in which the paver may be or in other words, the paver may be tilted at an angle but this would in no way affect the amount of water to be supplied to the mixing drum.

Still another object of the invention is to so construct the tank that the pressure in the lower compartment of the tank and the pressure in the upper portion of the tank may be equalized, or, as shown in the modified form, if the paver is to be used in extremely cold climates means may be provided in the tank wherein the pressure in the upper portion thereof may be relieved by the use of a vent.

With these and numerous other objects in view the invention consists in certain new and useful improvements and combination of parts as will be hereinafter more fully described and pointed out in the claims.

Referring now to the drawings showing a preferred embodiment and one slight modification.

Like numerals of reference indicate like parts throughout the specification.

Figure 1:
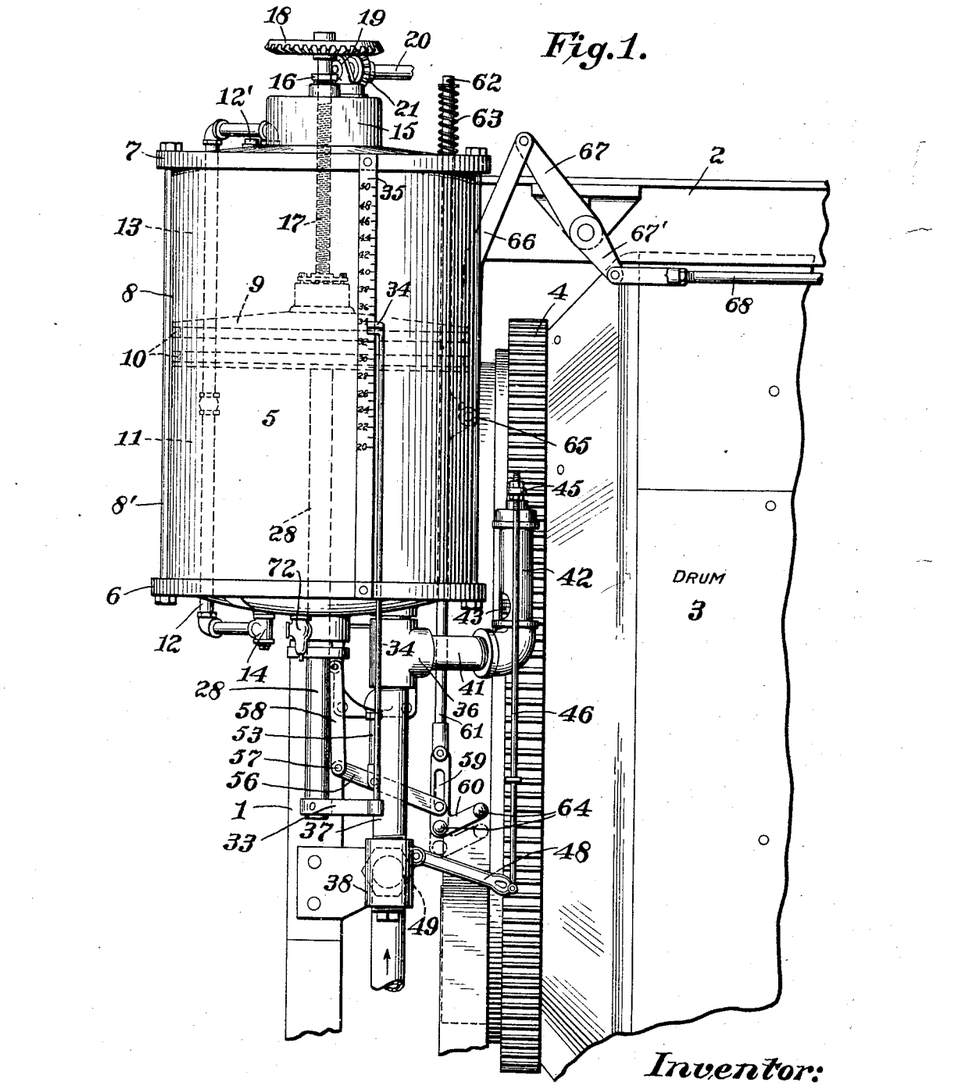
Fig. 1 is a side elevation of the improved tank showing the inlet valve open and the discharge valve closed and also showing a fragmentary portion of the mixing drum of the paver.

Referring now more particularly to the drawings, and to Fig. 1 in particular, there is shown a portion of a paver frame 1 and the upper frame 2, and a fragmentary portion of a mixer drum 3 with its ring gear 4 which is driven in the usual manner.

It might be here mentioned that the invention is particularly adapted for the large type pavers wherein relatively large batches of aggregates are mixed in the mixer drum and call for a relatively large quantity of water, but it will be readily appreciated as the description proceeds that the tank and its co-operating parts might be made on a smaller or larger scale and readily used on any machine or plant that requires predetermined amounts of water or liquid to be supplied at desired intervals.

Referring again to the structure of the invention, there will be seen the tank 5 which is in the form of a cylinder as it comprises a bottom casing 6, a top casing 7 and the shell 8, the parts being locked together by the rods 8'; the shell forming in reality a cylinder wall in which there is located an adjustable piston 9 which is provided with the piston rings 10 so that the chamber 11 will be air and water tight. In the preferred form, there is shown the pipe 12 extending from the bottom casing 6 around to the upper casing 7, so that, on the initial filling of the tank, after the chamber 11 is filled, the water will by-pass through the pipe 12 and fill the space or chamber 13 above the piston head so that the pressure in these two chambers will be equalized.

Figure 6:
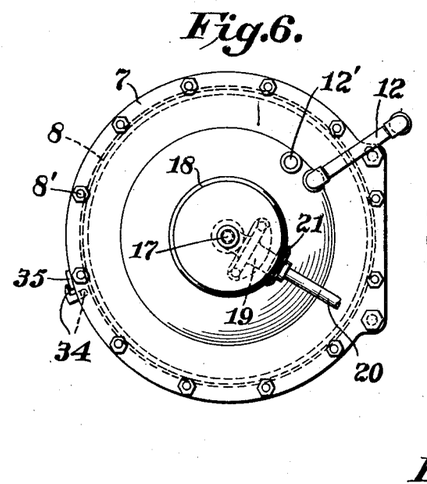
Fig. 6 is a top plan view of the tank casing.

Also in the preferred form, I have shown a small air vent 12' in the top casing (Fig. 6) so that if it is not desired to use the by-pass 12, air pressure may be relieved in the upper chamber when adjusting the piston, by opening the air vent and in order to prevent the water from passing into the pipe 12 and the chamber 13 in cold weather, I have provided a cut-off valve 14 at the lower end of the pipe 12.

Figure 10:
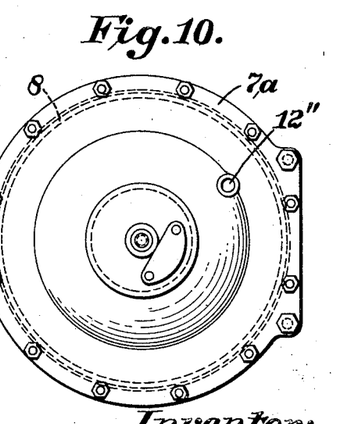
Fig. 10 is a view similar to Fig. 6 showing a slight modification, and showing a port in which an air vent may be secured.

Referring for the moment to Fig. 10 which shows a slight modification there is shown the top casing 7a similar to the casing 7 but in this instance, the pipe 12 and its connections are dispensed with and a small air vent 12'' is provided so that the piston head may be adjusted to vary the water capacity, and the air above it allowed to escape or take in accordingly.

Either or both arrangements are very satisfactory, but in a very cold spell, it might not be desirable to have the water standing above the piston as it is apt to freeze and cause serious damage.

Referring now to the upper casing 7, there will be seen a dome 15 in the top of which is a stuffing box 16 through which passes the stem or rod 17, and fitted on the upper end of this rod is the bevel gear 18. Mounted on the dome and under the gear 18 is a bearing bracket 19 to support the shaft 20 on which is mounted the pinion 21 meshing with the beveled gear 18. This shaft 20, it will be understood, extends across the paver at an angle, to a convenient position for the operator, where it is operated by the hand wheel 22, so that a movement of the wheel 22 will rotate the shaft 20 and through the gearing 21—18 and threaded rod 17 will move the piston 9 to vary the tank capacity.

Figures 2, 2A:
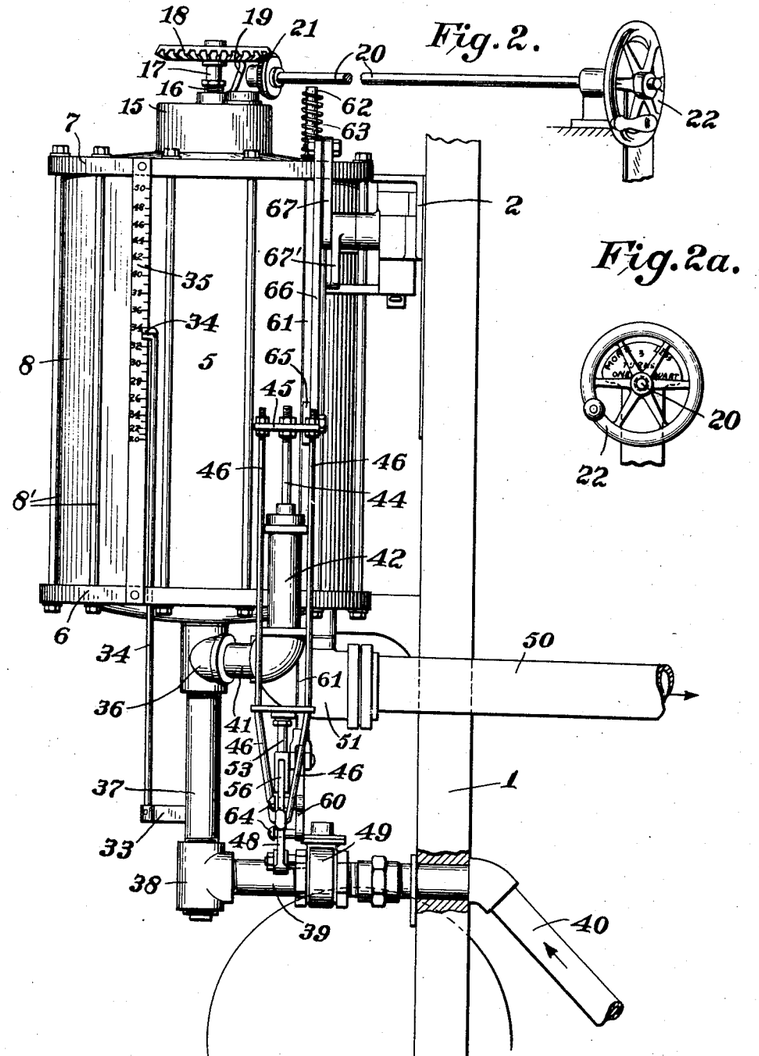
Fig. 2 is a side elevation taken at right angles to Fig. 1 showing the supply line and discharge line of the tank.
Fig. 2a is a fragmentary view showing a hand wheel for regulating the height of the adjustable piston in the tank.
Figure 5:
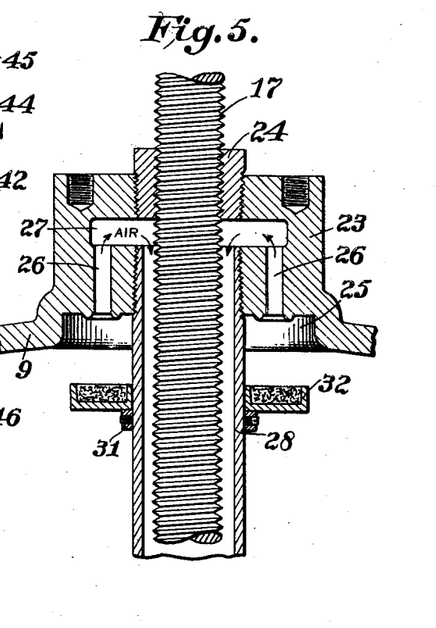
Fig. 5 is an enlarged sectional view showing the manner in which the air may escape from the water chamber of the tank and the manner in which the piston head is adjusted.

Referring now more specifically to the piston 9, the upper portion of which is shown in detail in Fig. 5, it will be seen that the same is provided with a central hub or boss 23 in which is fixed the internally threaded nut 24 through which the threaded rod 17 passes, so that when the hand wheel 22, as shown in Figs. 2 and 2a is revolved, the shaft 20, through the pinion and bevel gear will rotate the threaded rod 17 and thus raise or lower the piston 9.

It might be here mentioned that the ratio of the pinion and gear is such that three turns of the operating hand wheel 22 will vary the tank capacity one quart plus or minus, depending on the direction of rotation of the wheel.

It will be understood that the piston head only moves when the hand wheel is turned and its function is to vary the capacity of the chamber 11.

There is a small sight gage on the tank and the manner in which this is connected will shortly be explained.

Referring again to Fig. 5, it will be seen that the hub 23 of the piston 9 on its under surface is provided with an annular recess 25 from which lead a plurality of small air ports 26, connecting with the chamber 27 formed up in the hub. Also extending up into the hub is the small brass tube 28 which is threaded therein and thus surrounds or encases the threaded piston stem 17. The upper end of this tube 28 connects with the chamber 27, so that when the chamber 11 of the tank is being filled with water, the air may pass through the recess 25 and the passage-ways 26 into the chamber 27 and down through the pipe 28 to atmosphere.

The pipe 28 passes down through the bottom casing 6 and out through the same at 29, where there is also provided a stuffing box 30. This pipe 28 is open at the bottom, so that the air forced out of the chamber 11 may escape, as indicated above.

Again referring to Fig. 5, there may be seen a small adjustable boss 31 on the pipe 28 and resting on this boss is the diaphragm 32, or in other words a valve to cooperate with the air passage-ways 26.

This valve fits up within the annular recess 25 and after the air has been driven from the chamber 11 and the water rises flush with the valve 32 it will raise the same and close the passage-ways 26 to prevent any water from being driven out and down through the tube 28.

I have found in actual practice that if this diaphragm 32 is so constructed that the top will float about ¼" out of the water, it will seat itself sufficiently long before the tank completely fills to thereby prevent the escape of water through the air passages and tube 28.

By having the small boss or ring 31 adjustable, the place may be found where the diaphragm will seat in time to prevent any of the water from running into the tube, but at the same time will not allow the valve to prematurely close.

This is desirable as it sometimes happens that the pipe line when first connected contains a lot of air, and if the diaphragm is not set far enough down the tube, the sudden rush of air may close the valve to thus prevent the tank filling. In actual practice I have found that by having this valve or diaphragm 32 about one inch from its seat, it will allow all of the air to rush out without a prematurely seating of the valve.

Referring for the moment to Fig. 1, there will be seen secured to the pipe 28 the short arm 33 from which extends the upright indicator 34 to move along the calibrated sight gage 35, so that a glance at the gage will at all times indicate to what capacity the chamber 11 is limited.

In Figs. 1 and 2 may be seen the T 36 in the bottom of which is threaded the short pipe 37, while secured to the lower end of this pipe is the T 38, from which latter T leads the pipe 39, which in turn is connected to the main water supply line 40, through an inlet valve, the said supply line being supported by a portion of the frame work of the mixer.

Into the T 36, located below the bottom casing 6, is a short by-pass pipe 41, which leads into the small cylinder 42, in which is located a piston 43, the piston rod 44 extending upwardly to a cross head 45, from which depend the small rods 46, which in turn are connected at their lower ends to an arm 48, operating the main supply valve 49 placed in the inlet pipe just below the tank, between the pipe sections 39 and 40. The piston valve in the cylinder 42 is an automatic regulator for closing off the main water supply valve of the tank. Its interior construction is not described in detail, but it will be understood that after the tank is filled and four or five pounds pressure builds up in the tank, it will also equalize in the small cylinder 42 and raise the piston stem 44 and its rods 46 to thereby pull up valve lever 48 and close the main inlet valve 49. Thus it will be seen that shortly after the tank is filled and before there is any great pressure built up in the chamber 11 of the tank, the small piston valve will automatically cut off the supply of water.

Figures 3, 3A:
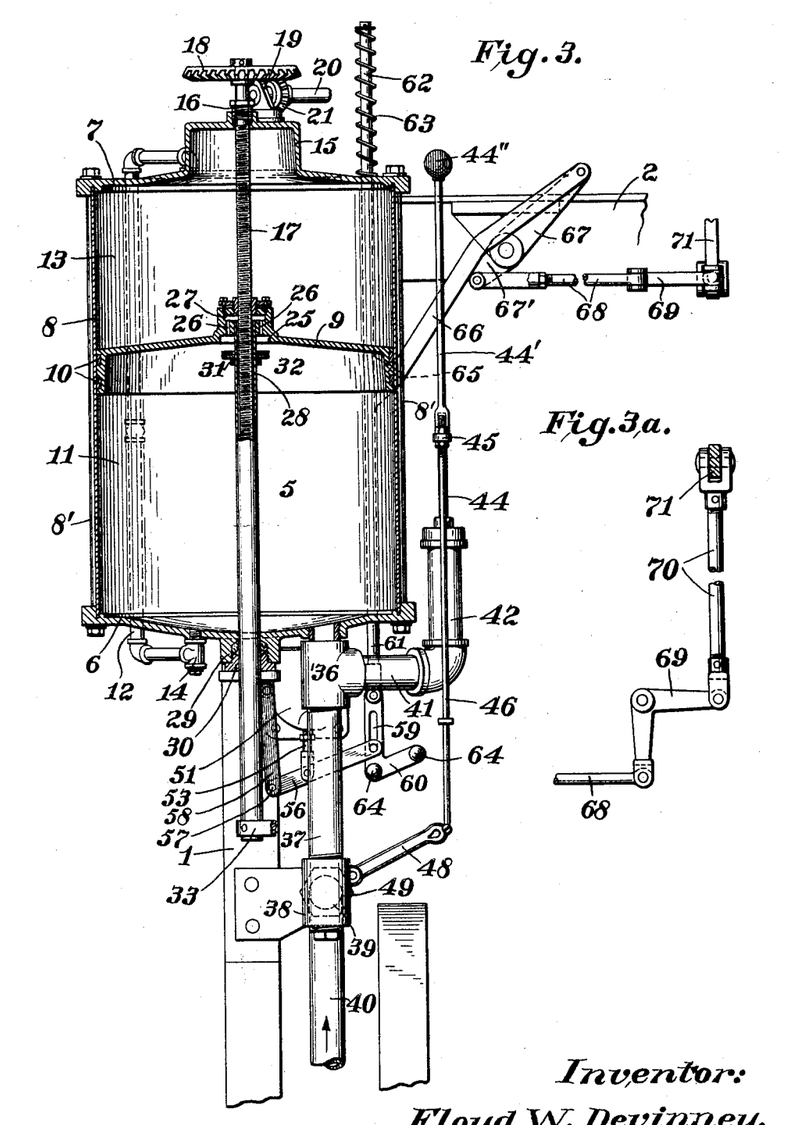
Fig. 3 is a sectional elevation viewed in the same direction as Fig. 1, but showing the inlet valve closed and the discharge valve opened, and an attachment for indicating to the operator that the tank is full.
Fig. 3a is a fragmentary plan showing the operating connections for the discharge valve.

It is desirable for the operator of the machine to be able to ascertain from his position on the machine when the water tank is full. In Fig. 3 I have shown one way of accomplishing this by the use of a small attachment which is in form of a signalling device for the operator. This attachment consists of an upright rod 44', that is to be threaded on the upper end of the piston stem 44 while at the top of this small rod 44' may be located a small red ball 44", which will project above the frame work 2 when the small piston 43 is in its uppermost position and the tank of course filled.

I have not shown this attachment in other views, as it will be readily understood from the one view Fig. 3.

It is also to be understood that any other desirable form of signalling means for the operator might be connected with this piston or stem to notify the operator that the tank is full and that he is free to operate the discharge valve and thus empty the tank into the mixing drum.

As will be mentioned later, when the tank is emptied, the pressure is relieved in the small cylinder and means are provided for forcing the piston 43 and its stem 44 and rods 46 back to normal position and thereby open the main inlet supply valve 49.

The tank 5 is provided with a discharge pipe 50 that will extend into the drum 3 of the mixer, so that the aggregates may be thoroughly mixed as desired.

The discharge pipe line 50 is provided with an elbow 51 which is secured in the lower casing 6.

It will be seen that this casing 6 slopes downwardly towards the discharge elbow 51, so as to form a well, to insure that the tank will be completely emptied when discharging.

Located on top of the elbow 51 and extending up within the tank is the main discharge valve 52, the stem 53 of which is guided, as at 54, and passes out through the stuffing box 55 and is connected at its lower end to the small lever 56, which is fulcrumed as at 57 to the small arm 58 secured to the lower portion of the tank.

Now this lever 56 is pinned in the slot 59, which slot is formed in the small foot 60, which foot in turn is secured to the vertically extending rod 61 that extends upwardly past the top of the tank at 62 and is normally held in an upward position by the coil spring 63.

The small foot 60 is provided with two outwardly extending pins 64 that are adapted to engage the lever 48 of the inlet valve 49 when the said vertical rod 61 is forced downwardly, to thereby kick the valve open.

About midway up the rod 61, there is a small lug 65, to which in turn is connected the off-set arm 66, the upper end of this arm being connected to the lever 67, while to the lower end 67′ of the lever is connected the pull rod 68.

This rod 68 is in turn connected to a bell-crank 69, which is operated by the rod 70, manipulated by a hand lever 71.

In Fig. 1, the rod 68 is shown as pulled towards the right of the figure, thus forcing the vertical rod 61 downwardly to close the discharge valve, as will be shortly mentioned, whereas in Fig. 3, the rod 68 has been moved inwardly, that is towards the tank to thus raise the rod 61 to open the discharge valve 52.

It might be here mentioned that the weight of the discharge valve 52 and the stem 53 will cause the same to lower itself and seat as quickly as it is allowed to do so when the vertical rod 61 is moved downwardly.

The operation is simple, but a cycle will be explained.

Supposing the tank is empty, that is both above and below the piston head and supposing it is desired to have forty-five gallons of water in the tank. The hand wheel 22 would be revolved which turns the beveled gears 18 and 21 and elevates the piston on the stem until the sight indicator 34 lines up with the mark 45. The water would be connected and turned on to the supply line 40 and the lever 48 would be in its lowered position as shown in Fig. 1. The water would pass up to the inlet pipe in the bottom casing, into the chamber 11 of the tank and some water would also pass up under the piston 43 in the cylinder 42. The air in the chamber 11 would, as the water rises, flow up through the air passages 26 into the chamber 27 and out through the tube 28 until the water would raise the valve 32 and cut off these passageways.

As I am supposing the tank is entirely empty, water would also flow through the pipe 12 as soon as there was pressure established and fill the tank above the head of the piston.

Figure 4:
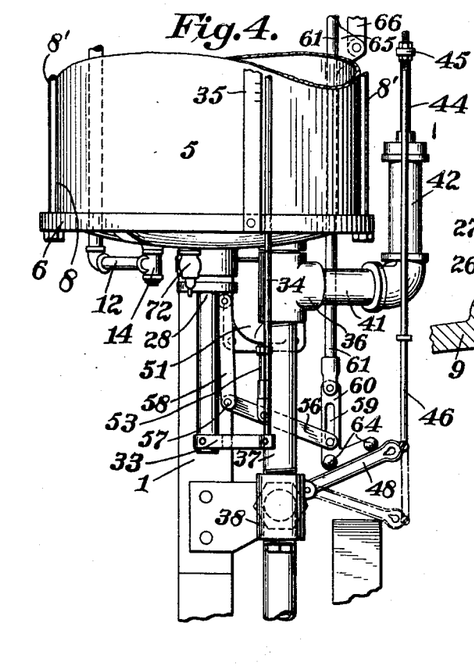
Fig. 4 is a fragmentary elevation of the lower portion of the tank, and showing the position of the controls when the inlet valve is yet closed and about to be kicked to its open position.

As soon as the tank is filled, and a small pressure builds up, the piston 43 in the small cylinder on the outside of the tank, will have been raised to the position shown in Fig. 2 and through the rods 46, will pull the lever 48 connected with the inlet valve to a closed position as shown in this figure and also in Figs. 3 and 4.

The tank is now full and the inlet has automatically cut-off.

Figures 7, 8, 9:
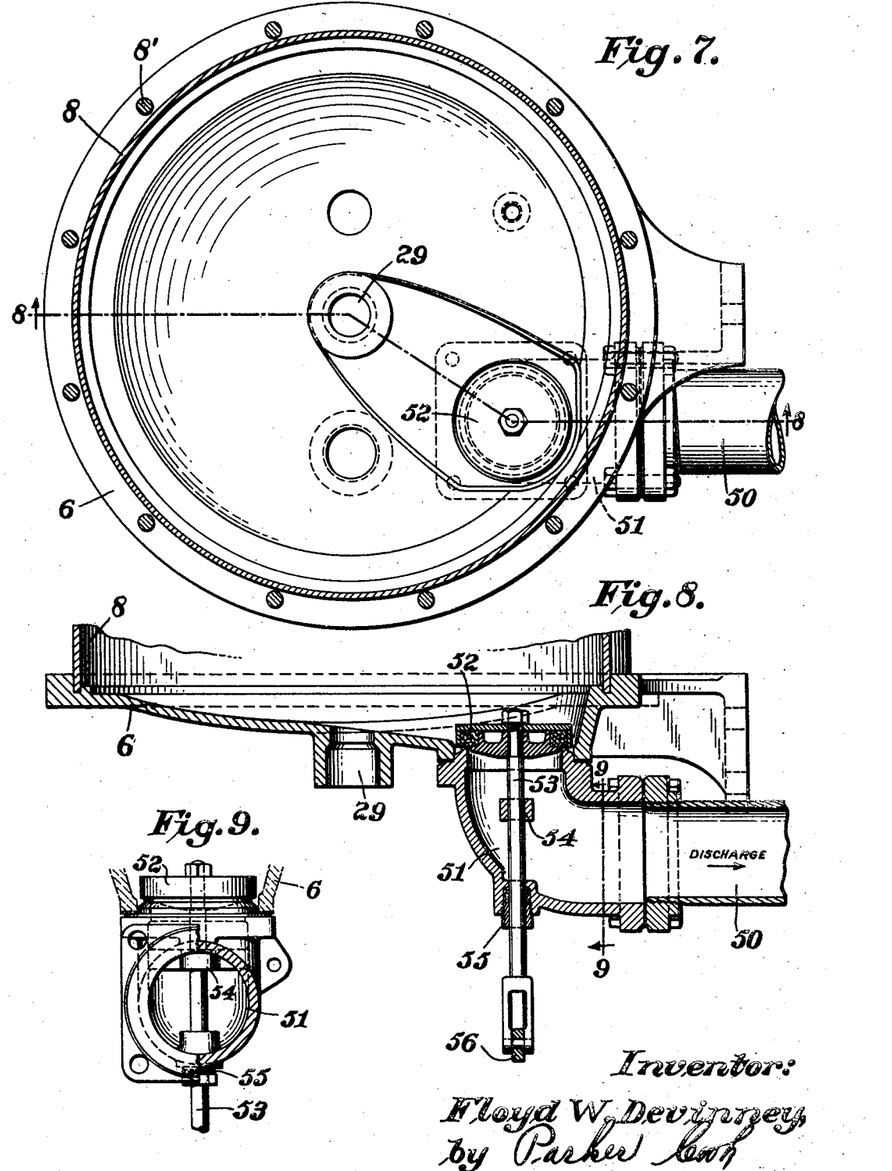
Fig. 7 is an enlarged sectional plan view taken on a line near the bottom of the tank.
Fig. 8 is a sectional view on line 8—8 of Fig. 7.
Fig. 9 is substantially a section on line 9—9 of Fig. 8.

The main discharge valve will be in the closed position shown in Fig. 1 and also in Fig. 8.

When it is desired to discharge the water into the drum, the rod 68 is operated manually by the operator, that is, forced towards the tank and the crank arm 66 will elevate the rod 61 and through the lever 56 and its slotted connection with the foot 60, the discharge valve will be raised allowing the tank to empty through the discharge line into the mixer drum. As the water is discharged from the tank, the pressure will also be relieved in the small cylinder 42. After the tank is emptied, the operator will pull the rod 68, which in turn will force the rod 61 downwardly and the weight of the discharge valve and its lever will let the discharge valve travel downwardly so that the lever 56 with its pin, will be in the bottom of the slot as shown in Fig. 3.

Now, as the rod 61 continues downwardly, it will reach the position as shown in Fig. 4, that is, the discharge valve will be closed and the continued downward movement of the rod 61 will cause the small foot 60 now contacting with the lever 48 to move the arm 48 to its open position; the slot 59 allowing the foot to continue downwardly after the discharge valve has been entirely closed.

The supply valve now being open, the tank will again fill up and after it fills and pressure is established, the small piston 43 will raise the arm 48 to automatically cut off the inlet where it will remain until the discharge has again been manually opened and then closed.

By providing the little slotted foot, it will be seen that the discharge valve will be entirely closed before the inlet valve is started to be opened, which is a desirable feature, as there is no chance, therefore, of the discharge valve being open and the inlet valve being open at the same time, as if this were the case, it would be impossible to correctly determine the amount of water that would be discharged from the tank into the mixing drum.

There are other reasons, also, why it is desirable and in some States, essential that the discharge be entirely closed, before the inlet valve is opened.

From the foregoing it will be seen that I have provided a storage tank for water for concrete pavers, wherein the capacity of the tank may be predetermined, so that the desired amount of water can be discharged into the mixing drum.

With the arrangement shown, this can be regulated to a nicety and it is but a simple matter to change the capacity of the tank to the number of gallons desired.

Furthermore, the tank can be built so that the pressure both behind and in front of the piston in the tank can be balanced by water pressure or an air vent valve may be provided in the tank head, so as to relieve the pressure when setting the same.

After it is determined how much water is wanted in the tank, the water may be turned on in the main supply line and after the tank has filled, it will be automatically cut off as has heretofore been explained and the water can be then discharged to the drum at any time and after the discharge valve is again closed, the inlet valve will be again opened.

The entire tank and its associated parts are extremely simple in construction, with very few moving parts and have proven highly efficient in active service.

It will be understood that I have shown the discharge as being manually operated, but it will be easily understood that this operating lever 68 might easily be connected to any of the desired moving parts of the paver, so that the discharge valve would be opened and closed when other moving parts are thrown into or out of operation.

Also, as a safety measure a small safety valve 72, (see Fig. 1), may be fitted in the bottom casing of the tank and set so that in case anything should fail and pressure be built up in the tank, the safety valve would operate.

Having thus described my invention, what I claim as new and desire to secure by Letters Patent is:—

1. A water tank having a piston therein, means for adjusting and setting the piston to predetermine the capacity of the tank, an inlet and discharge for said tank, auxiliary piston means for automatically cutting off the supply to said tank after the tank is filled, and manually operative means for discharging the contents of the tank.

2. A water tank having a piston head therein, means for adjusting the piston head to predetermine the capacity of the tank, an inlet and discharge for said tank, piston means connected with the tank and inlet for automatically cutting off the inlet to said tank after the same has filled and manually operated means for discharging the contents of the tank.

3. A water tank having a piston head therein, means for adjusting the piston head to predetermine the capacity of the tank, an inlet and discharge for said tank, piston means connected with the tank and inlet for automatically cutting off the supply to said tank after the tank has filled and means for opening and closing the discharge of the tank and the closing of the discharge automatically opening the inlet.

4. A water tank having a piston head therein, means for adjusting the piston head to predetermine the capacity of the tank, an inlet and discharge for said tank, auxiliary pressure means connected with the tank and inlet for automatically cutting off the supply to said tank after the tank has filled and manually operated means for opening and closing the discharge of the tank and the closing of the discharge automatically opening the inlet.

5. A tank for holding a liquid, an adjustably lockable head in said tank for determining the amount of liquid to be held, an inlet and discharge for said tank, small auxiliary piston means connected with the inlet for automatically cutting off the supply of said tank after the tank has filled, means for opening and closing the discharge from the tank and the said means cooperating with the means connected with the inlet, whereby after the discharge is closed the inlet will be automatically opened.

6. A tank for holding liquid, manually operated means for adjusting the capacity of the tank an air outlet for the tank, disk means included in the said manually-operated means for allowing the escape of air through said outlet as the tank is being filled and for closing the same when the tank is filled, an inlet pipe and discharge pipe for said tank, and a valve in the inlet pipe and piston means connected with the tank and the valve for cutting off said valve after the tank has filled, a valve in the discharge pipe and means for manually opening and closing the discharge valve and the said manually operated means connected with the inlet valve whereby the closing of the discharge valve will open the inlet valve.

7. A tank for holding liquids having a piston therein, a feed screw extending through the tank and in threaded engagement with said piston for raising and lowering the same, a tube passing through the lower portion of the tank and engaging said piston head and movable therewith, said piston head provided with a valve and air passage leading to said tube and permitting the air to pass through said piston head out through said tube and means for operating the feed screw.

8. A tank for holding liquids having a piston therein, a feed screw extending through the tank and in threaded engagement with said piston for raising and lowering the same, a tube passing through the lower portion of the tank and engaging said piston head and movable therewith, said piston head provided with a valve and air passage for permitting the air to pass through said piston head out through said tube, means for operating the feed screw, and an indicator carried by said tube external of the tank for showing the amount of liquid in said tank.

9. A tank for holding liquids having a piston therein, a feed screw extending through the tank and in threaded engagement with said piston for raising and lowering the same, a tube passing through the lower portion of the tank and engaging said piston head and movable therewith, said piston head provided with a valve, an air passage leading to said tube, the said valve adapted to close the air passage when the tank is filled and said valve allowing the escape of air through said tube as the tank is being filled.

10. A tank for holding liquids, means for predetermining the amount of liquid to be held by said tank, a discharge valve in the bottom of the tank, a lever connected to said discharge valve, an inlet valve connected with said tank, a rod connected to said lever, means for operating said rod to thereby operate the discharge valve, means connected with the inlet valve for automatically closing the same after the tank has filled, said rod extending in close proximity to said inlet valve and means on the bottom of said rod to open said inlet valve when said rod is operated and after the discharge valve has closed.

11. A tank for holding liquids, a discharge valve in the bottom of the tank, a lever connected to said valve, an inlet valve in the tank, a rod connected to said lever for opening and closing the discharge valve, means for operating said rod, means connected with the tank and the inlet valve for automatically closing the inlet after the tank has filled, a foot on the bottom of said rod, said foot in the path of movement of said inlet valve and said foot kicking the inlet valve open immediately upon the discharge valve being closed.

12. A tank for holding liquids having a piston head therein, a feed screw extending through the tank and in threaded engagement with said piston for raising and lowering the same, a tube passing through the lower portion of the tank and engaging said piston head and movable therewith, said piston head provided with a valve, an air passage in said piston head leading to said tube, the said valve adapted to close the air passage when the tank is filled and said valve allowing the escape of air in said tube as the tank is being filled, and a by-pass extending to the end of the tank on either side of the piston head, so that the pressure on both sides of the piston head may be equalized.

13. A tank for holding liquids, an inlet valve connected with the tank and means connected with the inlet valve and tank for automatically closing the inlet valve after the tank has filled, a discharge valve for the tank, means for opening and closing the discharge valve, the said last mentioned means connected to the means for closing the inlet valve, the connection having a pin and slot arrangement, whereby a part of the movement of said discharge operating means first closes the discharge valve while a continued movement thereof by virtue of the pin connection kicks the inlet valve open.

14. A measuring tank for liquids having an inlet supply and valve therefor and having a discharge pipe and valve therefor, automatic means for cutting off the supply, manual means for opening and closing the discharge valve, said means having a slotted foot at its lower end and located adjacent the inlet supply valve and a fulcrumed lever connected to said discharge valve and pinned in the slot of said foot, whereby the means for closing the discharge valve when operated will first entirely close the same while the continued movement of said means will allow the foot, through the slotted connection, to open said inlet supply.

15. A tank for holding liquid, piston means for predetermining the amount of liquid to be held, valve means associated with the piston means for allowing the escape of air as the tank is being filled and closing by the rising of the liquid in the tank, an inlet pipe provided with a valve and a discharge pipe for said tank also provided with a valve, automatic pressure means in the inlet pipe for closing the inlet valve after the tank is filled and a slight pressure is built up therein, means for opening and closing the discharge valve, and the means for closing the discharge valve and the means for closing the inlet valve cooperating whereby the inlet valve is opened only after the discharge valve is closed.

16. A water tank for concrete pavers having an inlet pipe and a discharge pipe and each of said pipes provided with a valve, auxiliary piston means for cutting off the valve in the inlet only after the tank is filled and a pressure built therein, manual means for opening and closing the discharge valve and the closing of the discharge valve automatically opening the inlet valve after the said discharge valve has fully closed.

17. A water tank for concrete pavers and means for adjusting the capacity of the tank, a supply pipe and a discharge pipe, a valve in the supply pipe and an auxiliary piston connected to the supply pipe and to the valve, the said piston cutting off the supply valve after the tank is filled and a pressure head built up therein, means for opening and closing the discharge supply valve and cooperating means between the supply valve and the discharge valve whereby a closing of the discharge valve will open the supply valve but only after said discharge valve has been fully closed.

18. A water supply tank for concrete pavers, an adjustable piston head in the tank for varying the capacity of the same and fixed means for equalizing the pressure behind the piston head, an inlet pipe and an outlet pipe for the tank, a valve in the inlet pipe and a valve in the outlet pipe, auxiliary piston means for cutting off the inlet valve after the tank is filled, means for opening and closing the outlet valve, and means for operating the inlet and outlet valves cooperating whereby the one valve is opened after the outlet valve has closed.

In testimony whereof I affix my signature.

FLOYD W. DE VINNEY.